United States Patent
Sanchez et al.

(10) Patent No.: US 11,610,173 B2
(45) Date of Patent: Mar. 21, 2023

(54) INTELLIGENT COLLABORATIVE PROJECT MANAGEMENT

(71) Applicant: SRI International, Menlo Park, CA (US)

(72) Inventors: Daniel J. Sanchez, Sunnyvale, CA (US); Huascar Sanchez, San Ramon, CA (US); Hassen Saidi, Palo Alto, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 112 days.

(21) Appl. No.: 16/751,048

(22) Filed: Jan. 23, 2020

(65) Prior Publication Data

US 2020/0394588 A1 Dec. 17, 2020

Related U.S. Application Data

(60) Provisional application No. 62/861,237, filed on Jun. 13, 2019.

(51) Int. Cl.
*G06Q 10/06* (2012.01)
*G06F 8/77* (2018.01)
(Continued)

(52) U.S. Cl.
CPC ......... *G06Q 10/06395* (2013.01); *G06F 8/77* (2013.01); *G06Q 10/06398* (2013.01); *G06Q 10/063114* (2013.01); *G06Q 10/101* (2013.01)

(58) Field of Classification Search
None
See application file for complete search history.

(56) References Cited

U.S. PATENT DOCUMENTS 7,778,866 B2    8/2010   Hughes
8,170,897 B1 *  5/2012   Cohen ................... G06Q 30/08
                                                    705/7.13

(Continued)

FOREIGN PATENT DOCUMENTS

CN    105913323 A    8/2016
CN    107807978 A    3/2018

OTHER PUBLICATIONS

Mashayekhi, Vahid, et al. "Distributed, collaborative software inspection." IEEE software 10.5 (1993): 66-75. (Year: 1993).*

(Continued)

*Primary Examiner* — Darlene Garcia-Guerra
(74) *Attorney, Agent, or Firm* — Shumaker & Sieffert, P.A.

(57) ABSTRACT

Techniques are disclosed for intelligently managing software development. In one example, a method for managing software development, includes receiving, by a computing system, a request to review source code written by a first developer, determining, by the computing system, a software skill set for the source code review, selecting, by the computing system, one or more selected source code reviewers from the pool of source code reviewers based on the software skill set and respective reputation scores for a pool of source code reviewers, assigning, by the computing system, one or more portions of the source code for code review to each of the selected source code reviewers, and determining, by the computing system, a consensus verification output on the code review based on review input from a majority of the selected source code reviewers.

20 Claims, 8 Drawing Sheets

(51) Int. Cl.
  *G06Q 10/10* (2012.01)
  *G06Q 10/0639* (2023.01)
  *G06Q 10/0631* (2023.01)
  *G06Q 10/101* (2023.01)

(56) References Cited

U.S. PATENT DOCUMENTS

| | | | |
|---|---|---|---|
| 8,499,278 B2 | 7/2013 | Hughes | |
| 8,561,045 B2* | 10/2013 | Porras | G06F 8/443 717/151 |
| 8,856,725 B1* | 10/2014 | Anderson | G06F 8/75 717/103 |
| 9,354,769 B1* | 5/2016 | Kudva | H04L 12/1822 |
| 10,834,210 B1* | 11/2020 | Resios | H04L 67/51 |
| 10,877,869 B1* | 12/2020 | Nair | G06Q 10/06 |
| 2002/0049738 A1* | 4/2002 | Epstein | G06F 16/951 |
| 2008/0196000 A1* | 8/2008 | Fernandez-Ivern | G06F 8/20 717/101 |
| 2008/0244522 A1* | 10/2008 | Bernin | G06F 8/71 717/122 |
| 2012/0204155 A1* | 8/2012 | Ben-Artzi | G06F 11/3688 717/125 |
| 2014/0196010 A1* | 7/2014 | Balachandran | G06F 8/70 717/124 |
| 2017/0075790 A1* | 3/2017 | Macleod | G06F 11/3668 |
| 2017/0212829 A1* | 7/2017 | Bales | G06N 3/0454 |
| 2017/0357565 A1* | 12/2017 | Ledet | G06F 8/73 |
| 2018/0129497 A1* | 5/2018 | Biddle | G06F 11/3668 |
| 2018/0285103 A1* | 10/2018 | Jha | G06F 8/10 |
| 2019/0050320 A1* | 2/2019 | Edri | G06F 11/3636 |
| 2019/0303541 A1* | 10/2019 | Reddy | G06F 21/64 |
| 2019/0317760 A1* | 10/2019 | Kessentini | G06F 8/65 |
| 2020/0005219 A1* | 1/2020 | Stevens | G06F 8/71 |
| 2020/0218636 A1* | 7/2020 | Anders | G06F 11/3608 |

OTHER PUBLICATIONS

Xiao, WenPeng, ChangYan Chi, and Min Yang. "On-line collaborative software development via wiki." Proceedings of the 2007 international symposium on Wikis. 2007. (Year: 2007).*
Alamer, Ghadah, and Sultan Alyahya. "Open Source Software Hosting Platforms: A Collaborative Perspective's Review." J. Softw. 12.4 (2017): 274-291 (Year: 2017).*
Alvaro et al., "Consistency Analysis in Bloom: a CALM and Collected Approach," CIDR 2011, Fifth Biennial Conference on Innovative Data Systems Research, Jan. 2011, 12 pp.
Alvaro et al., "DEDALUS: Datalog in Time and Space," Datalog Reloaded. Datalog 2.0 2010. Lecture Notes in Computer Science, vol. 6702, 2011, 20 pp. (Applicant points out, in accordance with MPEP 609.04(a), that the year of publication, 2011, is sufficiently earlier than the effective U.S. filing date, so that the particular month of publication is not in issue.).
Ambari et al., "Collaborative Workflow for Crowdsourcing Translation," Proceedings of the ACM 2012 Conference on Computer Supported Cooperative Work, Feb. 2012, 4 pp.
Anderson, J.R., "Skill Acquisition: Compilation of Weak-Method Problem Situations," Psychological Review, vol. 94, No. 2, Apr. 1987, 19 pp.
Andreessen, M., "Why Software is Eating the World," The Wall Street Journal, Aug. 2011, 9 pp.
Angel, B, "Code Review as a Service on GitHub," accessed from https://www.pullrequest.com/blog/github-code-review-service/, Dec. 11, 2017, 5 pp.
Bailis et al., "Coordination Avoidance in Database Systems," Proceedings of the VLDB Endowment, vol. 8, No. 3, Nov. 2014, 12 pp.
Bailis et al., "Eventual Consistency Today: Limitations, Extensions, and Beyond," ACMQueue, vol. 11, No. 3, Apr. 2013, 13 pp.
Bandura, A., "Social cognitive theory: An agentic perspective," Annual Review of Psychology, vol. 52, No. 1, Feb. 2001, 26 pp.
Bergersen et al., "Evaluating methods and technologies in software engineering with respect to developers' skill level," Proceedings of the International Conference on Evaluation & Assessment in Software Engineering, Jan. 2012, 10 pp.
Bergersen et al., "Programming Skill, Knowledge, and Working Memory Among Professional Software Developers from an Investment Theory Perspective," Journal of Individual Differences, vol. 32, No. 4, Jan. 2011, 28 pp.
Bernstein et al., "Rethinking Eventual Consistency," Proceedings of the 2013 ACM SIGMOD International Conference on Management of Data, Jun. 2013, 5 pp.
Bigham et al., "Human-Computer Interaction and Collective Intelligence," Collective Intelligence Handbook, Oct. 2015, 17 pp.
Birman et al., "Towards a Cloud Computing Research Agenda," ACM SIGACT News, vol. 40, No. 2, Jun. 2009, 13 pp.
Bloom Programming Language http://bloom-lang.net/calm/ accessed on May 1, 2018, 2 pp.
Brewer, E., "A Certain Freedom: Thoughts on the CAP Theorem," Proceedings of the 29th Annual ACM SIGACT-SIGOPS Symposium on Principles of Distributed Computing Jul. 2010, 1 pp.
Brewer, E., "CAP Twelve Years Later: How the "Rules" Have Changed," Computer, vol. 45, No. 2, Feb. 2012, 7 pp.
Brewer E., "Towards Robust Distributed Systems," Proceedings in the 19th Annual ACM Symposium on Principles of Distributed Computer (PODC) Jul. 2000, 12 pp.
Casalnuovo et al., "Developer Onboarding in GitHub: The Role of Prior Social Links and Language Experience." Proceedings of the 2015 10th Joint Meeting on Foundations of Software Engineering, Aug. 2015, 12 pp.
Cass, S., "The 2017 Top Programming Languages," IEEE Spectrum, Jul. 2017, 2 pp.
Chan et al., "Ridesharing in North America: Past, Present, and Future," Transport Reviews, vol. 32, No. 1, Jan. 2012, 20 pp.
Chilton et al., "Cascade: Crowdsourcing Taxonomy Creation," Proceedings of the SIGCHI Conference on Human Factors in Computing Systems, Apr. 2013, 10 pp.
Chin et al., "Open-Source Conceptual Sizing Models for the Hyperloop Passenger Pod," 56th AIAA/ASCE/AHS/ACS Structures, Structural Dynamics, and Materials Conference, Jan. 2015, 20 pp.
Cici et al., "Assessing the Potential of Ride-Sharing Using Mobile and Social Data: A Tale of Four Cities," Proceedings of the 2014 ACM International Joint Conference on Pervasive and Ubiquitous Computing, Sep. 2014, 11 pp.
Clow, D., "MOOCs and the Funnel of Participation," Proceedings of the Third International Conference on Learning Analytics and Knowledge, Apr. 2013, 5 pp.
Conway et al., "Logic and Lattices for Distributed Programming," Proceedings of the Third ACM Symposium on Cloud Computing, Oct. 2012, 14 pp.
Daly et al., "Social Network Analysis for Routing in Disconnected Delay-Tolerant MANETs," Proceedings of the 8th ACM International Symposium on Mobile ad hoc networking and computing, Sep. 2007, 9 pp.
Darley et al., "Bystander intervention in emergencies: Diffusion of responsibility," Journal of Personality and Social Psychology, vol. 8, No. 4, Apr. 1968, 7 pp.
Fava et al., "Crowdsourcing Program. Preconditions via a Classification Game," ICSE '16: Proceedings of the 38th International Conference on Software Engineering, May 2016, 11 pp.
Gagne et al., "Self-determination theory and work motivation," Journal of Organizational Behavior, vol. 26, No. 4, Jun. 2005, 32 pp.
Garcia-Molina et al., "Challenges in Data Crowdsourcing," IEEE Transactions on Knowledge and Data Engineering, vol. 28, No. 4, Apr. 2016, 14 pp.
Gee, T., "Automating Your Code Review Workflow with Upsource," accessed from https://blog.jetbrains.com/upsource/2017/04/13/automating-your-code-review-workflow-with-upsource/, Apr. 13, 2017, 11 pp.
Geister et al., "Effects of Process Feedback on Motivation, Satisfaction, and Performance in Virtual Teams," Small Group Research, vol. 37, No. 5, Oct. 2006, 31 pp.

(56) References Cited

OTHER PUBLICATIONS

Gousios et al., "Work Practices and Challenges in Pull-Based Development: The Integrator's Perspective," 2015 IEEE/ACM 37th IEEE International Conference on Software Engineering, May 2015, 11 pp.
Hars et al., "Working for free? Motivations for Participating in Open-Source Projects," Journal of Electronic Commerce, vol. 6, No. 3, 2002, 15 pp. (Applicant points out, in accordance with MPEP 609.04(a), that the year of publication. 2002, is sufficiently earlier than the effective U.S. filing date, so that the particular month of publication is not in issue.).
Hellerstein, J.M., "The Declarative Imperative: Experiences and Conjectures in Distributed Logic," ACM SIGMOD Record, vol. 39, No. 1, Mar. 2010, 15 pp.
Hui et al., "Bubble Rap: Social-based Forwarding in Delay Tolerant Networks," IEEE Transactions on Mobile Computing, vol. 10, No. 11, Nov. 2011, 24 pp.
Ikeda et al., "Collaborative Crowdsourcing with Crowd4U," Proceedings of the VLDB Endowment, vol. 9, No. 13, Sep. 2016, 4 pp.
Junior et al., "Developers Assignment for Analyzing Pull Requests," Proceedings of the 30th Annual ACM Symposium on Applied Computing, Apr. 2015, 6 pp.
Kalliamvakou et al., "Open Source-Style Collaborative Development Practices in Commercial Projects Using GitHub," 2015 IEEE/ACM 37th IEEE International Conference on Software Engineering, vol. 1, May 2015, 12 pp.
Kay et al., "MOOCs: So many learners, so much potential . . . ," IEEE Intelligent Systems, vol. 28, No. 3, May-Jun. 2013, 8 pp.
Kiersz, A., "The most and least expensive places to live in America," Business Insider, Dec. 2018, 49 pp.
Kim et al., "Mechanical Novel: Crowdsourcing Complex Work through Reflection and Revision," CSCW '17 Proceedings of the 2017 ACM Conference on Computer Supported Cooperative Work and Social Computing, Feb. 2017, 13 pp.
Kim et al., "Understanding Review Expertise of Developers: A Reviewer Recommendation Approach Based on Latent Dirichlet Allocation," Symmetry, vol. 10, No. 4, Apr. 2018, 18 pp.
Kittur et al., "Crowdforge: Crowdsourcing Complex Work," Proceedings of the 24th Annual ACM Symposium on User Interface Software and Technology, Oct. 2011, 10 pp.
Kulkarni et al., "Collaboratively Crowdsourcing Workflows with Turkomatic," Proceedings of the ACM 2012 Conference on Computer Supported Cooperative Work, Feb. 7, 2012, 10 pp.
Lakhani et al., "Why Hackers Do What They Do: Understanding Motivation and Effort in Free/Open Source Software Projects," MIT Sloan School of Management, Working Paper 4425-03 also available at SSRN Electronic Journal, Paper posted Sep. 2003, 28 pp.
Lin et al.. "Dynamically Switching between Synergistic Workflows for Crowdsourcing," Proceedings of the Twenty-sixth AAAI Conference on Artificial Intelligence, Jul. 2012, 7 pp.
Linstead et al., "Mining Concepts from Code with Probabilistic Topic Models," Proceedings of the twenty-second IEEE/ACM International Conference on Automated Software Engineering, Nov. 2007, 4 pp.
Little et al., "Exploring Iterative and Parallel Human Computation Processes," Proceedings of the ACM SIGKDD Workshop on Human Computation, Jul. 2010, 9 pp.
Little et al., "TurKit: Human Computation Algorithms on Mechanical Turk," Proceedings of the 23nd annual ACM Symposium on User Interface Software and Technology, Oct. 2010, 10 pp.
Lobo et al., "Declarative Distributed Computing," Correct Reasoning, Part of Lecture Notes in Computing Science book series (LNCS, vol. 7265), 2012, 17 pp. (Applicant points out, in accordance with MPEP 609.04(a), that the year of publication, 2012, is sufficiently earlier than the effective U.S. filing date, so that the particular month of publication is not in issue.).
Logas et al., "Software Verification Games: Designing Xylem, The Code of Plants," FDG, 2014, 8 pp. (Applicant points out, in accordance with MPEP 609.04(a), that the year of publication, 2014, is sufficiently earlier than the effective U.S. filing date, so that the particular month of publication is not in issue.).
Logas et al., "Xylem: The Code of Plants," FDG, 2014, 2 pp. (Applicant points out, in accordance with MPEP 609.04(a), that the year of publication, 2014, is sufficiently earlier than the effective U.S. filing date, so that the particular month of publication is not in issue.).
Lykourentzou et al., "Personality Matters: Balancing for Personality Types Leads to Better Outcomes for Crowd Teams," Proceedings of the 19th ACM Conference on Computer-Supported Cooperative Work & Social Computing, Feb. 2016, 14 pp.
Milano et al., "Sustainable Policy Making: A Strategic Challenge for Artificial Intelligence," AI Magazine, vol. 35, No. 3, Fall 2014, 14 pp. (Applicant points out, in accordance with MPEP 609.04(a), that the year of publication, 2014, is sufficiently earlier than the effective U.S. filing date, so that the particular month of publication is not in issue.).
Murray et al., "The Case for Crowd Computing," 2010 Proceedings of the second ACM SIGCOMM Workshop on Networking, Systems, and Applications on Mobile Handhelds, Aug. 2010, 6 pp.
Myers et al., "At the Boundary of Workflow and AI," Proceedings of the AAAI-99 Workshop on Agent-Based Systems in the Business Context held as part of AAAI-99, Jul. 1999, 9 pp.
Nagar et al., "Beyond the human-computation metaphor," 2011 IEEE Third International Conference on Privacy, Security, Risk and Trust and 2011 IEEE Third International Conference on Social Computing, Oct. 2011, 6 pp.
Olabarriaga et al., "Understanding Workflows for Distributed Computing: Nitty-gritty Details," Proceedings of the 8th Workshop on Workflows in Support of Large-Scale Science, Nov. 2013, 9 pp.
Rabbi et al., "Automated Personalized Feedback for Physical Activity and Dietary Behavior Change With Mobile Phones: A Randomized Controlled Trial on Adults," JMIR. mHealth and uHealth, vol. 3, No. 2, May 2015, 23 pp.
Retelny et al., "No Workflow Can Ever Be Enough: How Crowdsourcing Workflows Constrain Complex Work," Proceedings of the ACM on Human-Computer Interaction, Article No. 89, Dec. 2017, 23 pp.
Roberts et al., "Understanding the Motivations, Participation, and Performance of Open Source Software Developers: A Longitudinal Study of the Apache Projects," Management Science, vol. 52, No. 7, Jul. 2006, 16 pp.
Ryan et al., "Self-Determination Theory and the Facilitation of Intrinsic Motivation, Social Development, and Well-Being," American Psychologist, vol. 55, No. 1, Jan. 2000, 11 pp.
Saito et al., "Optimistic Replication," ACM Computing Surveys, vol. 37, No. 1, Mar. 2005, 44 pp.
Staples et al., "A Self-Efficacy Theory Explanation for the Management of Remote Workers in Virtual Organizations," Journal of Computer-Mediated Communication, vol. 3, No. 4, Jun. 1998, 37 pp.
Steinmacher et al., "Social Barriers Faced by Newcomers Placing Their First Contribution in Open Source Software Projects," Proceedings of the 18th ACM Conference on Computer Supported Cooperative Work & Social Computing, Feb. 2015, 13 pp.
Steinmacher et al., "The Hard Life of Open Source Software Project Newcomers," International Workshop on Cooperative and Human Aspects of Software Engineering (CHASE 2014) Jun. 2014, 7 pp.
Stewart et al., "Chapter 20—Disruptions: Truth and Consequences," Phantom Ex Machina—Digital Disruption's Role in Business Model Transformation, Springer Oct. 2017, 17 pp.
Terrell et al., "Gender differences and bias in open source: Pull request acceptance of women versus men," PeerJ Computer Science, 3:e 111, May 2017, 30 pp.
Tufano et al., "When and why your code starts to smell bad," 2015 IEEE/ACM 37th IEEE International Conference on Software Engineering, May 2015, 13 pp.
Van de Ven et al., "Determinants of Coordination Modes within Organizations," American Sociological Association, vol. 41, No. 2, Apr. 1976, 17 pp.
Vansteenkiste et al., "The development of the five mini-theories of self-determination theory: An historical overview, emerging trends, and future directions," In T.C. Urdan & S.A. Karabenick (Eds.), Advances in Motivation and Achievement, vol. 16A—The decade

(56) References Cited

OTHER PUBLICATIONS ahead: Theoretical perspectives on motivation and achievement, Emerald Group Publishing Limited, London, England, Jul. 2010, 63 pp.

Vogels, W., "Eventually Consistent," Communications of the ACM, vol. 52, No. 1, Jan. 2009, 5 pp.

Weld et al., "Artificial Intelligence and Collective Intelligence," In Thomas W. Malone and Michael S. Bernstein (Eds.), Handbook of Collective Intelligence, MIT Press, 2015, 11 pp. (Applicant points out, in accordance with MPEP 609.04(a), that the year of publication, 2015, is sufficiently earlier than the effective U.S. filing date, so that the particular month of publication is not in issue.).

"Split-brain (computing)," Wikipedia, last edited on Jun. 24, 2020, accessed at https://en.wikipedia.org/wiki/Split-brain_%28computing%29, on Aug. 12, 2020, 2 pp.

"Time to completion." Wikipedia, last edited Aug. 7, 2018, accessed at https://en.wikipedia.org/wiki/Time_to_completion, on Aug. 12, 2020, 1 pp.

"What technologies does PullRequest support?" retrieved from https://support.pullrequest.com/hc/en-us/articles/115001076974-What-technologies-does-PullRequest-support-, Aug. 12. 2020, 4 pp.

\* cited by examiner

INTELLIGENT COLLABORATIVE PROJECT MANAGEMENT

CROSS REFERENCE

This application claims the benefit of U.S. Provisional Patent Application No. 62/861,237, filed on Jun. 13, 2019, which is incorporated by reference herein in its entirety.

TECHNICAL FIELD

This disclosure generally relates to intelligently managing collaborative projects.

BACKGROUND

Many projects can be accomplished in a collaborative fashion. For example, source code, particularly open-source software, may be developed in a collaborative fashion, with two or more independent software developers contributing to a source code project. A software development manager typically assigns software development tasks (e.g., portions of code to draft or review) to contributors (e.g., developers, testers), who usually have a standing relationship with the software development manager.

SUMMARY

In general, the disclosure describes techniques for intelligently managing collaborative projects. In particular, this disclosure describes a collaborative project management system that supports a plurality of contributors. The system matches contributors and reviewers using intelligent work creation, distribution, and integration techniques. As described further here, the system applies an order-independent ("disorderly") model of human and machine computation, to the management of collaborative projects, freeing workers to produce creative contributions without synchronization overhead. For example, deep contribution analysis assesses the quality of contributions for a collaborative project to create worker competency and reputation summaries and is used to provide automated matching of work needs to contributors and/or reviewers. Eventual consistency models enable the support of anytime contributions and also guarantee coordination-free work integration for an "always-on" system experience, removing the conflicts that cause delays between independent work submissions and review. This can help reduce unassigned work, useless forks, and disconnected networks of requestors and reviewers such as source code developers and source code reviewers in cases where the techniques are applied to software development. The system further provides a lightweight and consensus-based verification technique that is a many-eyes consensus protocol to support distributed and decentralized contribution review that guarantees multi-party review (many-eyes) for enhanced quality control and to fragment authority and distribute management overhead for enhanced development productivity. This reduces the management bottleneck by not requiring a single development manager be responsible for reviewing all incoming work.

One example application of collaborative project management is to software development. According to examples of the disclosure, a software development management application supporting public and private source code development matches source code developers and source code reviewers using intelligent work creation, distribution, and integration techniques. As described further here, the software development management system is based on an order independent (disorderly) model of human and machine computation that frees workers to produce creative contributions without synchronization overhead. For example, deep contribution analysis assesses the quality of source code contributions on software repositories to create developer competency and reputation summaries and is used to provide automated matching of work needs to contributors (e.g., software developers, software reviewers). Using eventual consistency models enables the support of anytime contributions and also guarantee coordination-free work integration, removing the conflicts that cause delays between independent work submissions and review. This can help reduce unassigned work, useless forks, and disconnected networks of requestors and reviewers such as source code developers and source code reviewers. The software development management application further provides a lightweight and consensus-based verification technique that that is a many-eyes consensus protocol to support distributed and decentralized contribution review that guarantees multi-party code review (many-eyes) for enhanced software security and quality and to fragment authority and distribute management overhead for enhanced development productivity. This reduces the management bottleneck by not requiring a single development manager be responsible for reviewing all incoming work.

According to examples of this disclosure, a computing system that executes a software development management application manages a software repository (e.g., an open-source project repository) and receives source code contributions from different source code developers. For example, a software developer may submit (e.g., push) a source code submission (e.g., a code "commit") for review and integration to the system. When the system receives the submission, it automatically partitions the submission's source code into one or more portions, analyzes the partitions (annotating them as soon as the analysis completes), determines a skill set necessary to review these annotated portions, and routes the partitions and annotations to a set of source code reviewers from a pool of available source code reviewers. Within this action stream, the system may optimize the routing of these annotated portions. For example, the system may filter the pool of available source code reviewers by the skill set appropriate or necessary to complete the source code review and intelligently assigns the one or more portions of the source code for review to the set of capable source code reviewers from the filtered pool of available source code reviewers based on a reputation score. During assignment, the system assesses reviewer characteristics (expertise, past work history) and code characteristics (complexity, behavior). For example, the system may assign each of the one or more portions of source code to the source code reviewers with the highest reputation score of the filtered pool of available source code reviewers. In some examples, the system may assign a particular portion of source code to two or more source code reviewers. In some examples, once a source code reviewer completes a review of a particular portion of source code, the system may automatically reassign, using the same selection criteria, the same particular portion of source code for review by one or more additional source code reviewers. Source code review by multiple source code reviewers may occur in parallel. This provides a distributed and decentralized review protocol that guarantees multi-party code review (many-eyes) in an efficient manner for enhanced software security. In some examples, the system maintains a distributed "oracle" to record source code reviews and assessment among the source code reviewers in the network. This oracle is usually a type of database that is shared, replicated, and synchronized among the participating source code reviewers. It maintains a shared status of the source code under review. The shared status of source code (e.g., an entire project and/or each portion) is usually a data structure supported by the replicated oracle. The system then forms a consensus verification output for the submitted source code based on aggregated and correlated feedback from all the source code reviewers. In this way, the system guarantees multi-party code review of the same portion of code for greater quality control. Once a portion of the source code is verified, the system may automatically integrate it into the source code repository and/or source code project.

According to examples of this disclosure, the reputation score leverages concepts of trust (T), authority (A), and reputation (R) to incentivize the software developers responsible for distributed and decentralized code review. An individual's reputation score (or "TAR" power) dictates their standing in the community (or network), and directly affects their level of autonomy and the work available to them. This turns the reputation score into a valuable social and networking construct, and it essentially acts as a quantification of the status and current methods employed in open source development, where influence and competency are critical and on display. The social capital of reputation score provides its value, and it can be reduced if the user has poor work habits, poor code submissions, poor timeliness, or other behavior or work product that tarnishes their identity. Trust may represent the subjective view other users have of one's identity and capability. Authority may represent the influence or autonomy an individual has, which provides the user freedom over the ability to create, assign, and handle work. Reputation may represent the objective capability or competency of a user, based on tangible work that has been completed. Reputation is the most stable component of a user's reputation score but is also the most laborious to obtain based on being directly tied to successful work completion and verification. Authority, while a very useful and valuable incentive, can only be wielded temporarily and is only usable based on a stake of trust, which can be massively reduced if authority is misused.

According to examples of this disclosure, the reputation score for each contributor is managed by the system. For example, the system may assign a maximum reputation score to new source code reviewers (e.g., 100 points) and either maintain or reduce their reputation score over time. In this way, new source code reviewers will automatically be given an opportunity to take on software development tasks while incentivizing them to maintain a high reputation score. In some examples, the system may reduce the reputation score for a source code reviewer in response to the reviewer not performing well. For example, the system may reduce the source code reviewer's reputation score for not completing assignments, late completion of assignments, poor source code review quality, poor source code contribution quality, non-responsiveness, missing bugs in source code, or any other factor that would otherwise tarnish a source code reviewer's reputation. In some examples, the system may increase a reputation score (without exceeding the maximum) over time. For example, the system may increase the reputation score for a source code reviewer in response to timely completed assignments, quality source code reviews, and quality source code submissions.

The techniques of the disclosure may provide specific technical improvements to software development managements systems, particularly software development management systems with an open-source code repository. The process of assigning software development tasks to independent contributors can be laborious and tedious process for the software development manager as she may have to manually determine the skill set necessary to complete the development tasks and inquire into the availability of known contributors, which may delay the development process. For example, many companies offer tests for assessing software developer competency, and software development managers have to serially view and assess source code contributors. Further, other potential contributors that are interested in additional work but that do not have an existing relationship with the software development manager may not have development tasks assigned to them—resulting in underutilized source code contributors. The techniques of the disclosure may speed up the software development process by, among other things, automatically assigning source code review tasks. Automatically assigning source code review tasks removes bottlenecks in distributed software development by decentralizing control and authority required to manage complex open source software. Decentralization creates connectivity between source code developers and source code developers in a way that makes collaborative software development seamless and simple. Decentralization streamlines the software development process, developers' workflows, and their contributions—facilitating a (1) sustainable flow of needed work and best workers, and a (2) semi-automated security process that leverages consensus-making algorithms at scale. Further, the techniques of the disclosure may increase source code quality by requiring that multiple source code reviewers review the same code. Additionally, the use of a reputation score will ensure that available source code reviewers are not underutilized while incentivizing source code reviewers to complete source code review assignments thoroughly and on time. Together, these techniques may dramatically reduce the management overhead in software development, supporting both workers and managers. In some examples, a system in accordance with this disclosure may be integrated with open source platforms, such as GitHub, offered as a marketplace service. In other examples, a software development management application in accordance with this disclosure may be implemented in a separate platform.

In one example, this disclosure describes a method for managing software development, comprising: receiving, by a computing system, a request to review source code written by a first developer; determining, by the computing system, a software skill set for the source code review; selecting, by the computing system based on the software skill set and respective reputation scores for a pool of source code reviewers, one or more selected source code reviewers from the pool of source code reviewers; assigning, by the computing system, one or more portions of the source code for code review to each of the selected source code reviewers; and determining, by the computing system, a consensus verification output on the code review based on aggregated and correlated review input from a majority of the selected source code reviewers.

In another example, this disclosure describes a non-transitory, computer-readable medium comprising instructions that, when executed, cause one or more processors to: receive a request to review source code written by a first developer; determine a software skill set for the source code review; select, based on the software skill set and respective reputation scores for a pool of source code reviewers, one or more selected source code reviewers from the pool of source code reviewers; assign one or more portions of the source code for review to each of the selected source code reviewers; and determine a consensus verification output on the first code review based on aggregated and correlated review input from a majority of the selected source code reviewers.

In another example, this disclosure describes a software development management system comprising: one or more processors in communication with a memory, configured to execute a software development management application comprising: a source code analyzer configured to receive a request to review source code written by a first developer; the source code analyzer further configured to determine a software skill set for source code review; a source code reviewer selector configured to select, based on the software skill set and respective reputation scores for a pool of source code reviewers, one or more selected source code reviewers from the pool of source code reviewers; the source code reviewer selector further configured to assign one or more portions of the source code for review to each of the selected source code reviewers; and a source code verification unit configured to determine a consensus verification output on the first code review based on aggregated and correlated review input from a majority of the selected source code reviewers.

Although the techniques in this disclosure are described herein as primarily managing software development projects, such techniques may be performed, in whole or part, to manage any collaborative project.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
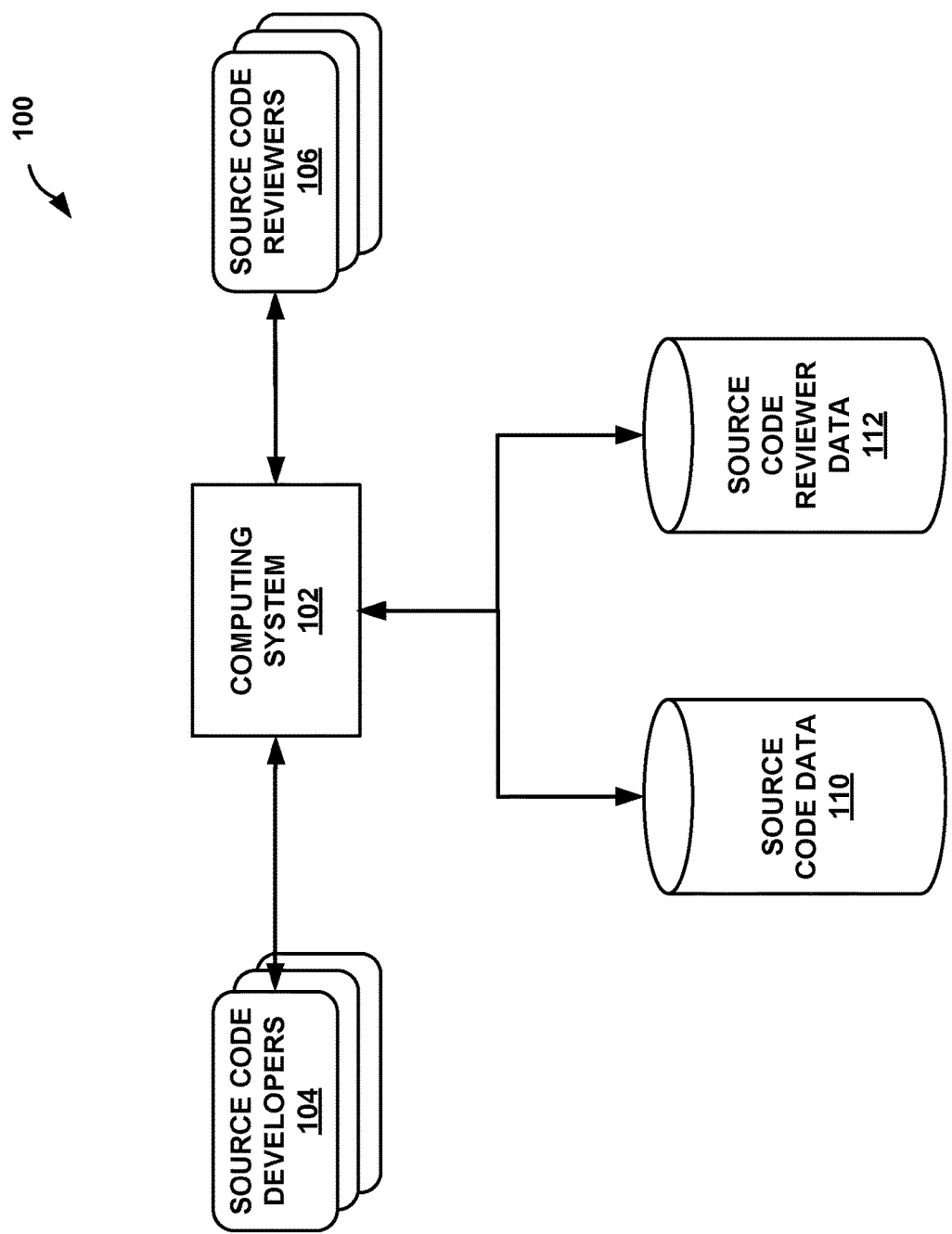
FIG. 1 is a block diagram illustrating an example computing system configured to intelligently manage software development in accordance with the techniques of the disclosure.

FIG. 1 is a block diagram illustrating an example software development management system 100 configured to intelligently manage software development in accordance with the techniques of the disclosure. In particular, software development management system 100 includes computing system 102, source code developers 104, source code reviewers 106, source code data 110, and source code reviewer data 112. Source code developers 104 and source code reviewers 106 represent examples of various types of computers that may be used by software developers and source reviewers, respectively. Moreover, source code developers 104 and source code reviewers 106 correspond to the same computer or contributor. That is, a contributor may serve as both a source code developer and a source code reviewer for code written by others. While source code data 110 and source code reviewer data 112 are shown as separate databases, in some examples, source code data 110 and source code reviewer data 112 can be implemented in one database or stored within the memory of computing system 102. In some examples, computing system 102, source code developers 104, source code reviewers 106, source code data 110, and source code reviewer 112 may communicate or otherwise exchange data over a network (e.g., a private network, a public network, the Internet).

Computing system 102 represents an example of a software development management system that manages a software repository (e.g., an open-source project repository) and project. For example, computing system 102 receives a request to review source code (e.g., open-source code) from one of source code developers 104. Computing system 102 automatically analyzes the received source code to determine a skill set necessary to review the code. For example, computing system 102 may use syntactic and semantic code analytics to perform deep contribution analysis on source code contributions to provide skill, competency, and reputation summaries of potential workers. These summaries may be used to rank workers and assign them to work, providing recruiting and work creation management. Computing system 102 also partitions the code submission into one or more portions and stores the one or more portions of code in source code data 110. In some examples, source code may overlap between the partitioned portions. In some examples, computing system 102 further stores other information associated with the received source code in source code data 110 (e.g., the skill set necessary to review the source code, the author of the source code, source code identifier, importance of source code to source code project; the deadline for the source code project). In some examples, the computing system 102 first partitions the source code into one or more portions of source code and determines a respective skill set necessary to review each portion of the source code.

Next, computing system 102 assigns each portion of source code for review to one or more source code reviewers 106. For example, computing system 102 maintains source code reviewer data 112 about source code reviewers 106, including availability, skill set (e.g., known programming languages, available software development and/or review tools, proficiency level of programing languages, work experience, education, previous projects), and reputation score (e.g., a metric that represents a source code reviewer's reputation or trustworthiness). In some examples, computing system 102 obtains skill set information from each source code reviewers 106 by prompting them with questions about their expertise. For example, computing system 102 may require each source code reviewer to create a profile detailing their experience and knowledge. In some examples, a source code reviewer's proficiency level of a programming language may be on a scale of 1 to 10 (e.g., Java level 6, Java level 8).

In some examples, the reputation score leverages concepts of trust (T), authority (A), and reputation (R) to incentivize the software developers responsible for distributed and decentralized code review. An individual's reputation score (or "TAR" score) dictates their standing in the community, and directly affects their level of autonomy and the work available to them. This turns the reputation score into a valuable social and networking construct, and it essentially acts as a quantification of the status and current methods employed in open source development, where influence and competency are critical and on display. The social capital of reputation score provides its value, and it can be reduced if the user is not well behaved, thereby tarnishing their identity. Trust is defined as the subjective view other users have of one's identity and capability. Authority is the influence or autonomy an individual has, which provides the user freedom over the ability to create, assign, and handle work. Reputation is defined as the objective capability or competency of a user, based on tangible work that has been completed and reviewed. Reputation is the most stable component of a user's reputation score, but is also the most laborious to obtain based on being directly tied to successful work completion and verification. Authority, while a very useful and valuable incentive, can only be wielded temporarily and is only usable based on a stake of trust, which can be massively reduced if authority is misused.

To select the source code reviewers for the review, computing system 102 filters the source code reviewer data by availability, by skill set, and/or by reputation score. For example, computing system 102 may assign each portion of source code to one or more source code reviewers with the highest reputation score of the available source code reviewers with the necessary skill set. Computing system 102 may assign a particular portion of source code to two or more source code reviewers for parallel review. Computing system 102 eventually aggregates and correlates the feedback of the review in source code data 110. For example, computing system 102 may aggregate and correlate the feedback as it receives it from the source code reviewers or after a certain period of time (e.g., a deadline for the review). In some examples, once a particular source code reviewer 106 completes their review of the assigned portion of source code, computing system 102 may automatically reassign the same portion of source code for review by one or more other source code reviewers 106. In this way, computing system 102 ensures that the particular portion of source code is reviewed by multiple reviewers, but that the code reviewers' work is also reviewed. Computing system 102 then forms a consensus verification output for the portion of source code based on aggregated and correlated feedback from all the source code reviewers that reviewed the portion of source code. In this way, the system guarantees multi-party code review of the same portion of code for greater quality control. Once a portion of the source code is verified, the system may automatically integrate it into the source code repository and/or source code project.

In some examples, some source code reviewers 106 are supervisors. In such examples, computing system 102 may ensure that federated groups of source code reviewers have a supervisor. A supervisor creates vetting requests, accepts vetting outcomes from reviewers in the group, and updates the distributed oracle, which can include the shared status of source code (as described below). Unless they are supervisors, reviewers are passive: they cannot issue vetting requests on their own but simply respond to supervisor's code review requests. Ultimately, the goal of the supervisor is to spend the least amount of effort evaluating reviewers. To accomplish this, the supervisor may find the smallest subset of code review requests such that each reviewer is assigned a task in that subset. This problem is NP-HARD as it can be reduced from the Vertex Cover problem. However, if every reachable reviewer in the network is assigned at most k code reviews, there are fast k approximation algorithms for finding the smallest subset of review tasks such that each reviewer is assigned one task from this subset.

In the examples with a supervisors, computing system 102 may initiate supervisor election procedures in response to: (1) new code review requests, (2) "heartbeat" timeouts, and (3) frequent misbehaving. For example, computing system 102 may require each supervisor to periodically send a "heartbeat" (e.g., a message, signal or any other indication that the supervisor is still active) to its pool of source code reviewers to maintain authority, otherwise a supervisor election is triggered. If a supervisor election is triggered, computing system 102 may elect a supervisor based on reputation score (e.g., TAR power) and/or tenure.

Each developer in the network should always deliver—in most cases—good quality work in a timely manner as computing system 102 will periodically check their standing on the network. Any signs of misbehaving (submission of poor-quality reviews, code review timeouts) will cause computing system 102 to tarnish (e.g., reduce) a developer's or supervisor's reputation score in the network. In some examples, such a penalty could trigger either a supervisor election or developer discharge from the group.

In some examples, a supervisor manages a copy of the oracle, which includes a shared status of source code (e.g., an entire project and/or each portion) in a data structure. In some examples, a supervisor keeps its oracle in sync with the oracles of all supervisors in the decentralized (and federated) network through replication. For example, when a supervisor gets a code review request, the supervisor adds it to its oracle as a new entry, and then sends a request to every reviewer so they can do the same thing in an eventually consistent manner. Each entry in the oracle maintains an index and a monotonically increasing timestamp. It also includes a vetting specification. The index determines the position of the entry in the oracle and the timestamp is a unit of time that indicates the entry's time of inclusion in the oracle. The vetting specification defines the scope of what to review which can represented as a difference (e.g., diff or delta) between the current system and how the system would look like with the change.

In some examples, each entry in the oracle must be replicated to all supervisors to ensure consistency and will retry this operation until every supervisor has also replicated this entry. Computing system 102 does this is an eventually consistent manner. That is, a code review request is routed to any available reviewer it could contact. This code review request forwarding becomes an anti-entropy process, which is the process of comparing the oracle of all reviewers (and other supervisors) and updating each replica to the newest version. This anti-entropy process should be an asynchronous process. The computing system 102 then assumes that any partitions or failures are healed, and oracle updates are eventually propagated.

In some examples, code review requests are conditionally appended to the oracle. This means they are volatile or not yet final. Thus, the clients interested in a code review outcome will not get a confirmation on whether the code review request operation succeeds and is in progress or completed. It is until each supervisor of each generated cluster gets a consensus from a majority of the reviewers in the cluster and its able to certify the quality of the review.

In some examples, to ensure the oracle is correctly replicated and that code review requests are fulfilled, some safety measures are necessary. For example, computing system 102 makes sure that the supervisors for a timestamp have committed entries from all previous timestamps in their oracles. This helps ensure that all oracles are consistent and up to date. To determine which of two oracles are more up-to-date, computing system 102 may compare the index and timestamp of the last entries in both oracles.

Figure 2:
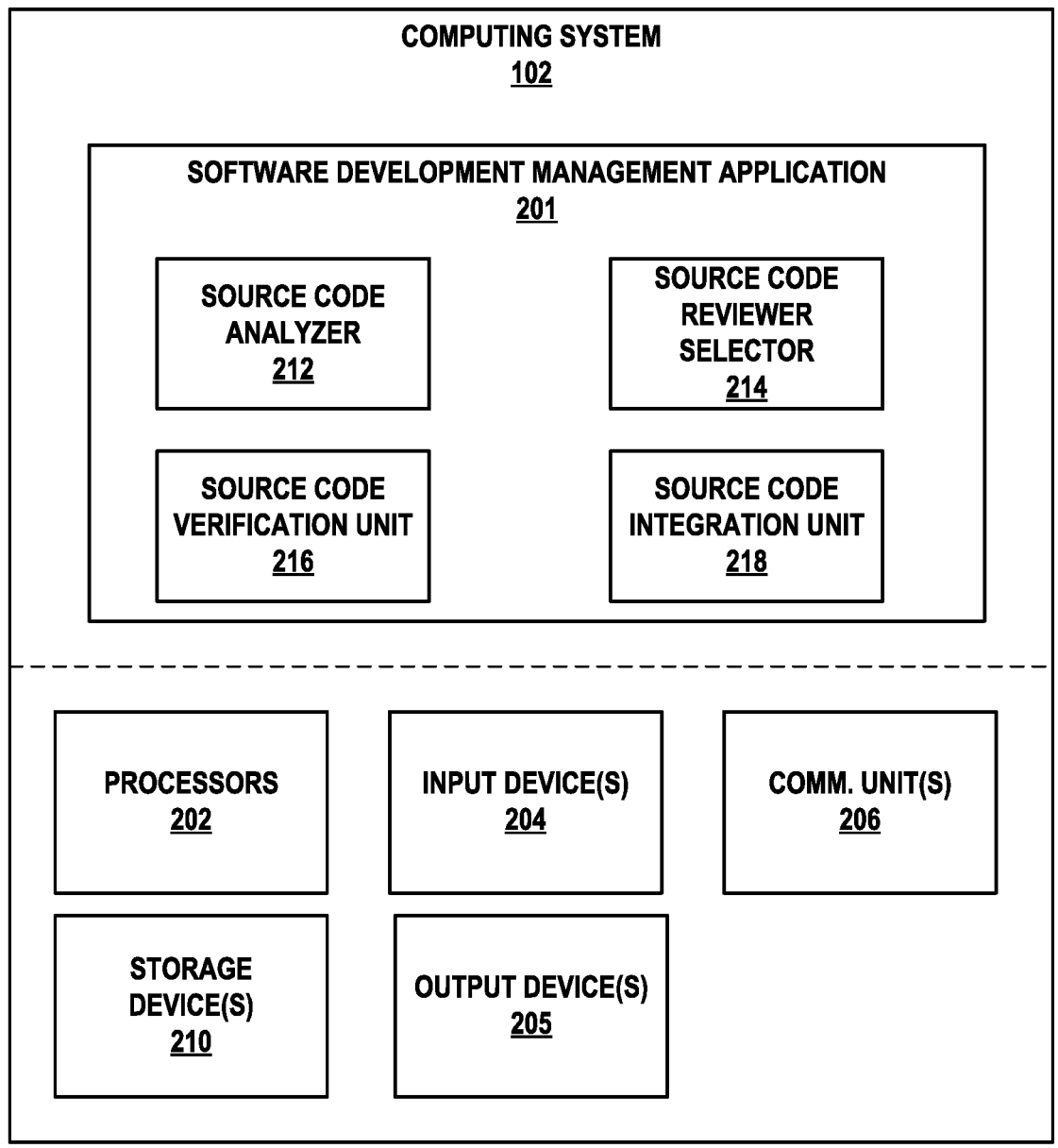
FIG. 2 is a block diagram illustrating an example set of components of a computer device configured to perform the techniques of the disclosure.

FIG. 2 is a block diagram illustrating an example instance of computing system 102 of FIG. 1, according to techniques of the disclosure. In this example of FIG. 2, computing system 102 includes one or more processors 202, one or more input devices 204, one or more output devices 205, one or more communication units 206 and one or more storage devices 210. In some examples, computing system 102 represents a cloud computing system, server farm, and/or server cluster (or portion thereof) that provides services to client devices and other devices or systems. In other examples, computing system 102 may represent or be implemented through one or more virtualized compute instances (e.g., virtual machines, containers) of a data center, cloud computing system, server farm, and/or server cluster.

One or more of the devices, modules, storage areas, or other components of computing system 102 may be interconnected to enable inter-component communications (physically, communicatively, and/or operatively). In some examples, such connectivity may be provided by communication channels, a system bus, a network connection, an inter-process communication data structure, or any other method for communicating data.

One or more processors 202 of computing system 102 may implement functionality and/or execute instructions associated with computing system 102 or associated with one or more modules illustrated herein and/or described below. One or more processors 202 may be, may be part of, and/or may include processing circuitry that performs operations in accordance with one or more aspects of the present disclosure. Examples of processors 202 include microprocessors, application processors, display controllers, auxiliary processors, one or more sensor hubs, and any other hardware configured to function as a processor, a processing unit, or a processing device. Computing system 102 may use one or more processors 202 to perform operations in accordance with one or more aspects of the present disclosure using software, hardware, firmware, or a mixture of hardware, software, and firmware residing in and/or executing at computing system 102.

One or more communication units 206 of computing system 102 may communicate with devices external to computing system 102 by transmitting and/or receiving data, and may operate, in some respects, as both an input device and an output device. In some examples, communication units 206 may communicate with other devices over a network. In other examples, communication units 206 may send and/or receive radio signals on a radio network such as a cellular radio network. In other examples, communication units 206 of computing system 102 may transmit and/or receive satellite signals on a satellite network such as a Global Positioning System (GPS) network. Examples of communication units 206 include a network interface card (e.g. such as an Ethernet card), an optical transceiver, a radio frequency transceiver, a GPS receiver, or any other type of device that can send and/or receive information. Other examples of communication units 206 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 204 may represent any input devices of computing system 102 not otherwise separately described herein. One or more input devices 204 may generate, receive, and/or process input from any type of device capable of detecting input from a human or machine. For example, one or more input devices 204 may generate, receive, and/or process input in the form of electrical, physical, audio, image, and/or visual input (e.g., peripheral device, keyboard, microphone, camera).

One or more output devices 205 may represent any output devices of computing system 102 not otherwise separately described herein. One or more output devices 205 may generate, receive, and/or process input from any type of device capable of detecting input from a human or machine. For example, one or more output devices 205 may generate, receive, and/or process output in the form of electrical and/or physical output (e.g., peripheral device, actuator).

One or more storage devices 210 within computing system 102 may store information for processing during operation of computing system 102. Storage devices 210 may store program instructions and/or data associated with one or more of the modules described in accordance with one or more aspects of this disclosure. One or more processors 202 and one or more storage devices 210 may provide an operating environment or platform for such modules, which may be implemented as software, but may in some examples include any combination of hardware, firmware, and software. One or more processors 202 may execute instructions and one or more storage devices 210 may store instructions and/or data of one or more modules. The combination of processors 202 and storage devices 210 may retrieve, store, and/or execute the instructions and/or data of one or more applications, modules, or software. Processors 202 and/or storage devices 210 may also be operably coupled to one or more other software and/or hardware components, including, but not limited to, one or more of the components of computing system 102 and/or one or more devices or systems illustrated as being connected to computing system 102.

In some examples, one or more storage devices 210 are temporary memories, meaning that a primary purpose of the one or more storage devices is not long-term storage. Storage devices 210 of computing system 102 may be configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art. Storage devices 320, in some examples, also include one or more computer-readable storage media. Storage devices 320 may be configured to store larger amounts of information than volatile memory. Storage devices 320 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Software development management application 201 of FIG. 2 includes a source code analyzer 212, a source code reviewer selector 214, a source code verification unit 216, and a source code integration unit 218. Software development management application 201 may include executable code and executes on the hardware environment provided by computing system 102. As described in greater detail elsewhere in this disclosure, computing system 102 may receive, at one or more communications units 206, a request to source code submission written by one of source code developers 104 for integration into a software repository and/or software project. Source code analyzer 212 automatically analyzes the received source code to determine a skill set appropriate or necessary to review the code and, optionally, stores the skill set in source code data 110 of FIG. 1 and/or in one or more storage devices 210. Source code analyzer 212 also partitions the code submission into one or more portions and stores the one or more portions of code in source code data 110 of FIG. 1 and/or one or more storage devices 210. In some examples, source code analyzer 212 further stores other information associated with the received source code in source code data 110 of FIG. 1. This other information may include the author of the source code, a source code identifier (ID), the importance of source code to source code project, the deadline for the source code project, a list of related source code projects, or any other information that may be helpful to review or track the submitted source code. In some examples, source code analyzer 212 first partitions the received source code into one or more portions of source code and determines a respective skill set necessary to review each portion of the source code. In some examples, one or more storage devices 210 may further include source code data 110 and/or source code reviewer data 112 (not shown).

Source code reviewer selector 214 then assigns each portion of source code for review to one or more source code reviewers 106 of FIG. 1. For example, to select the source code reviewers for the review, source code reviewer selector 214 queries, via one or more communication units 206, source code reviewer data 112 for available source code reviewers with the necessary skill set to review the received source code. Source code reviewer selector 214 then assigns N portions of source code to N source code reviewers with the Nth highest reputation score of the available source code reviewers with the necessary skill set (e.g., to N capable source code reviewers). For example, if source code analyzer 212 partitioned the receive source code into five partitions, source code reviewer selector may assign the five partitions to five source code reviewers with the five highest reputation scores of the available source code reviewers with the necessary skill set. In some examples, source code reviewer selector 214 assigns each portion of source code to an available source code reviewer with the necessary skill set and a respective reputation score above a threshold reputation score. In some examples, sourced code reviewer selector 214 may assign the same portion of source code to two or more source code reviewers.

Once a first source code reviewer 106 completes his review of the assigned portion of source code, source code verification unit 216 stores the source code reviewer's feedback of the code in source code data 110 and source code reviewer selector 214 may, optionally, reassign the same portion of source code to a second set of source code reviewers 106 for another review. In some examples, source code reviewer selector 214 provides the second set of source code reviewers with the feedback from the first source code reviewer (e.g., for verification purposes and/or to determine the quality of that reviewer's code review). In this way, the system guarantees multi-party code review of the same portion of code for greater quality control.

Source code verification unit 216 then aggregates and correlates the feedback of the second set of source code reviewers in source code data 110 and forms a consensus verification output for the portion of source code based on aggregated and correlated feedback from all the source code reviewers that reviewed the same portion of source code. The feedback from source code reviewers 106 may include one or more indications that the submitted source code is ready for integration (e.g., ready to be put into production), contains bugs, is inefficient, is incomplete, does not behave as expected (e.g., does not receive the proper inputs and/or does not produce the proper outputs as defined by a source code specification), or any other feedback about the source code. The following table illustrates possible consensus verification outputs for different feedback combinations. For example, as shown in the table, source code verification unit 216 will set the consensus verification output as ready for integration if all of the source code reviewer feedback indicates that the code is ready for integration. In another example, source code verification unit 216 will set the consensus verification output as ready for integration if a majority of the feedback indicates that the source code is ready for integration and the other feedback indicates that the source code is inefficient. In some examples, if even one source code reviewer indicate that the source code contained bugs, was incomplete, or was not as expected, source code verification unit 216 may set the consensus verification output to rejected as shown below.

TABLE 1

| Scenario | Ready for Integration | Contains Bugs | Inefficient | Incomplete | Not as Expected | Outcome |
|---|---|---|---|---|---|---|
| 1 | X | 0 | 0 | 0 | 0 | Integrate |
| 2 | X | 0 | X | 0 | 0 | Integrate |
| 3 | — | X | — | — | — | Reject |
| 4 | — | — | — | X | — | Reject |
| 5 | — | — | — | — | X | Reject |

In some examples, when the consensus verification outcome is set to rejected, computing system 102 notifies (e.g., via one or more communication units 206) the source code developer that submitted the source code. In some examples, the developer may then address any identified issues in the feedback and resubmit the update code to computing system 102 for review. When the consensus verification outcome is set to integrate, source code integration unit 218 automatically integrates the code into the source code project and/or source code repository. For example, source code integration unit 218 incorporates the source code into the production source code by either adding the code (or replacing other existing code) to the source code repository and, optionally, recompiling the updated production source code and deploying new executable files. In some examples, source code integration unit 218 automatically integrates one or more portions of source code for which a consensus verification outcome is set to integrate. In this way, source code integration unit 218 iteratively integrates portions of submitted code until all portions of the submitted code are integrated into the production source code.

Figure 3:
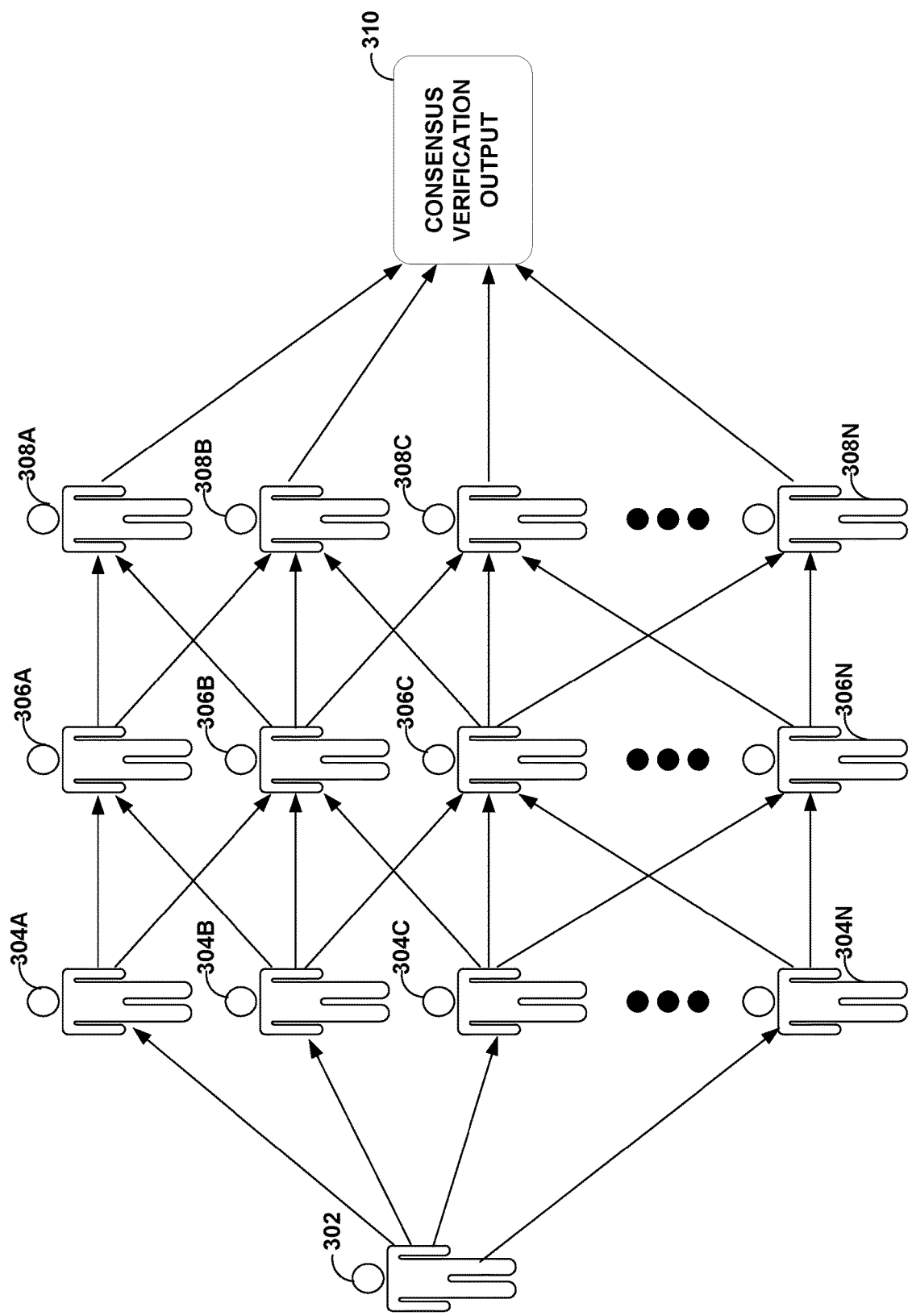
FIG. 3 is an illustration depicting an example source code review process flow in accordance with the techniques of the disclosure.

FIG. 3 is an illustration depicting an example source code review process flow in accordance with the techniques of the disclosure. In this example, source code developer 302 submits (e.g., pushes or commits) open-source code for review and integration into a source code project to a software development management system (e.g., computing system 102). In some examples, source code developer 302 may correspond to one or more source code developers 104 of FIG. 1.

The software development management system automatically analyzes the submitted source code to determine a skill set necessary to review the code and partitions the code submission into one or more portions. The software development management system then assigns each portion of source code for review to source code reviewers 304A-304N (collectively, "source code reviewers 304"), who have the necessary skill set for the review. That is, in this example the software development management system partitions the submitted source code from software developer 302 into X different portions and assigns each of the X portions to source code reviewers 304A-304N for review. In some examples, the value of X may be less than the value of N and the software development management system assigns the same portion of source code to two or more different source code reviewers 304. To select source code reviewers 304 for the review, the source code management system queries or filters potential source code reviewers (e.g., from source code reviewer data 112) by certain selection criteria, including availability, skill set, and/or reputation score, as described above. In some examples, the software development management system does not partition the submitted source code and assigns the submitted entire source code for review to each of source code reviewers 304.

As shown in FIG. 3, the system fragments code review as an opportunistic and decentralized network, consisting of several federated but compatible clusters of source code reviewers. In some examples, the assignment of code review tasks to reviewers is modeled as a bipartite graph, where nodes in the graph represent reviewers and code review work, and edges represent code review assignments. The system permits redundancy of review assignments (i.e., code review replication) to support availability and partition tolerance. In some examples, the system only discloses the agreed code review outcome to the interested clients (e.g., project maintainer) until a majority of reviewers have finished the review.

Once one of source code reviewers 304 completes his or her review of the assigned portion of source code, the software development management system may reassign the same portion of source code for review to one or more of source code reviewers 306A-306N (collectively, "source code reviewers 306") using the same selection criteria (e.g., availability, skill set, and/or reputation score). For example, once source code reviewer 304A finishes the review of her assigned portion of source code, the software development management system reassigns the same portion of source code reviewed by source code reviewer 304A to each of source code reviewers 306A and 306B. Similarly, once source code reviewer 304B finishes the review of her assigned portion of source code, the software development management system reassigns the same portion of source code reviewed by source code reviewer 304B to each of source code reviewers 306A, 306B, and 306C. While these examples show the same portion of source code being reassigned to two or three other source code reviewers, it is understood the software management may reassign the source code to fewer than or more than two source code reviewers.

In some examples, once one of source code reviewers 306 completes his or her review of the assigned portion of source code, the software development management system may again reassign the same portion of source code for review by one or more of source code reviewers 308A-308N (collectively, "source code reviewers 306") using the same selection criteria (e.g., availability, skill set, and/or reputation score). In some examples, the software development management system may reassign the same portion of source code for review by one or more of source code reviewers 308A-308N (collectively, "source code reviewers 306") using the different selection criteria (e.g., skill set and/or reputation score reflective of greater expertise). For example, once source code reviewer 306A finishes the review of her assigned portion of source code, the software development management system reassigns the same portion of source code reviewed by source code reviewer 306A to each of source code reviewers 308A and 308B. Similarly, once source code reviewer 306B finishes the review of her assigned portion of source code, the software development management system reassigns the same portion of source code reviewed by source code reviewer 306B to each of source code reviewers 308A, 308B, and 308C. While these examples show the same portion of source code being reassigned to two or three other source code reviewers, it is understood the software management may reassign the source code to more or fewer than two reviewers.

Once all of source code reviewers 304, 306, and 308 complete their review of the submitted source code (including all portions), the source code management system forms a consensus verification output 310 for the source code based on aggregated and correlated feedback from all the source code reviewers that reviewed the submitted source code. In some examples, once all of source code reviewers 304, 306, and 308 complete their review of the same portion of source code, the source code management system forms a consensus verification output 310 for that portion of source code based on the feedback from all the source code reviewers that reviewed that portion of source code. Source code integration unit 218 then automatically integrates the one or more portions of source code for which a consensus verification outcome is set to integrate.

In some examples, source code reviewers 304, 306, and 308 correspond to source code reviewers 106 of FIG. 1. While FIG. 3 shows three sets or rounds of source code reviewers (i.e., source code reviewers 304, 306, 308) reviewing the submitted source code, it is understood that fewer or more sets or rounds or source code reviewers may review the submitted source code. For example, two rounds of source code reviewers may review the submitted source code. In another example, four or more rounds of source code reviewers may review the submitted source code. In this way, the software development management system guarantees multi-party code review of the same portion of code for greater quality control. Once the source code (or a portion of the source code) is verified, the software development management system may automatically integrate the submitted source code into the source code project and/or source code repository.

Figure 4:
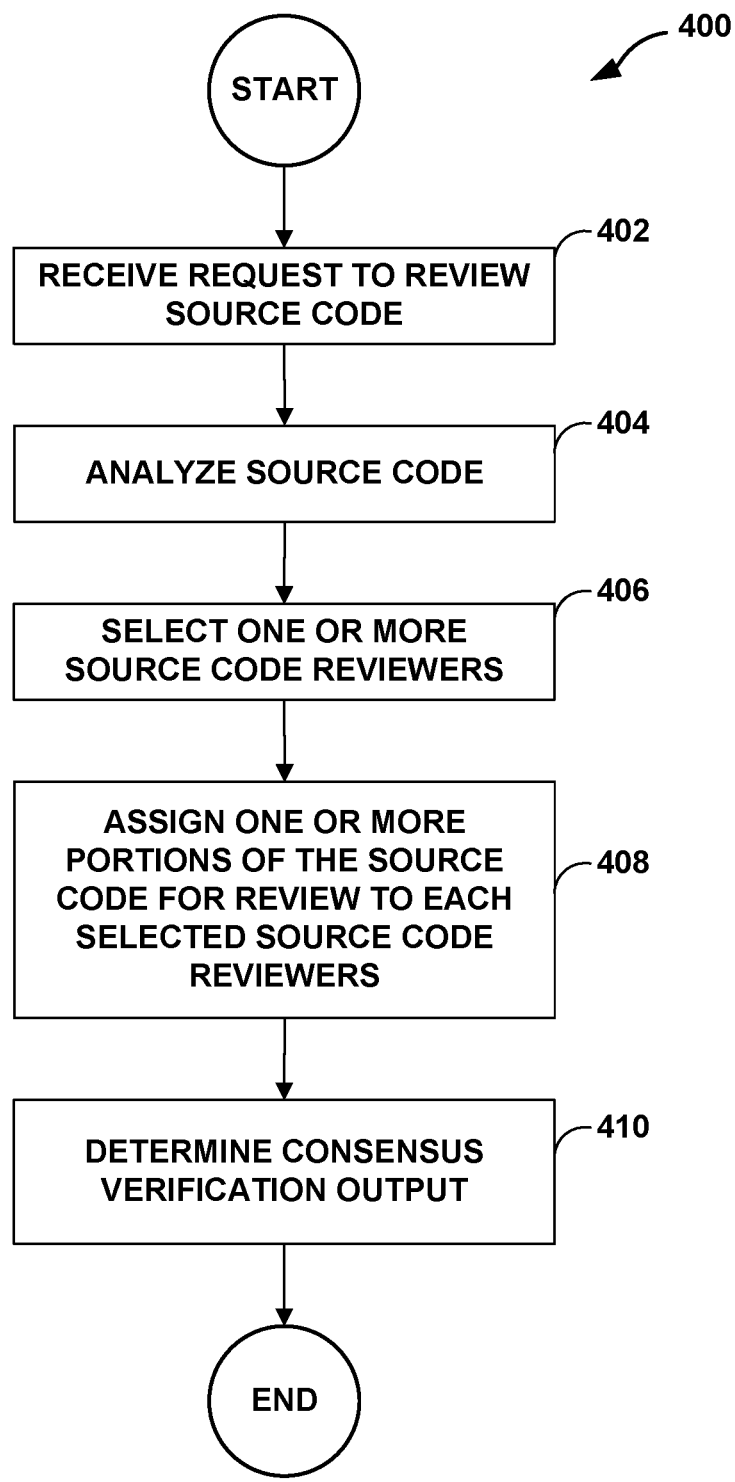
FIG. 4 is a flowchart illustrating an example method of managing software development according to the techniques of this disclosure.

FIG. 4 is a flowchart 400 illustrating an example operations of computing system 102 for managing software development according to the techniques of this disclosure. First, computing system 102 receives, at one or more communications units 206, a request to review source code from a software developer (e.g., one or more software developers 104 of FIG. 1, software developer 302 of FIG. 3) (402). Then source code analyzer 212 automatically analyzes the received source code to determine a skill set necessary to review the code and, optionally, stores the skill set in source code data 110 of FIG. 1 and/or in one or more storage devices 210 (404). In some examples, source code analyzer 212 also partitions the code submission into N (e.g., one or more) portions (where the N portions may or may not overlap) and stores the one or more portions of code (e.g., in source code data 110 of FIG. 1 and/or one or more storage devices 210). In some examples, source code analyzer 212 further stores other information associated with the received source code, including, for example, the author of the source code, a source code identifier (ID), the importance of source code to source code project, the deadline for the source code project, a list of related source code projects, or any other information that may be helpful to review or track the submitted source code. In some examples, source code analyzer 212 first partitions the received source code into one or more portions of source code and determines a respective skill set necessary to review each portion of the source code.

Next, source code reviewer selector 214 selects one or more source code reviewers (e.g., source code reviewers 106 of FIG. 1; source code reviewers 304 of FIG. 3) (406). For example, source code reviewer selector 214 queries, via one or more communication units 206, source code reviewer data 112 for available source code reviewers with the necessary skill set to review the received source code. Source code reviewer selector 214 then selects the N available source code reviewers with the Nth highest reputation score and with the necessary skill set. In some examples, source code reviewer selector 214 selects N available source code reviewers with the necessary skill set and a respective reputation score above a threshold reputation score. Source code reviewer selector 214 then assigns one or more partitions of source code to the N selected source code reviewers for review (e.g., source code reviewers 304A-304N of FIG. 3) (408).

Source code verification unit 216 then forms a consensus verification output for the submitted source code based on the aggregated and correlated feedback from all the source code reviewers (410). In some examples, source code verification unit 216 uses an eventual consistency model to reconcile different feedback temporal orders and enables asynchrony (and hence high performance). In some examples, the source code verification unit 216 also aggregates and correlates the feedback from source code reviewers (e.g., in source code data 110 or one or more storage devices 210). As described above, source code verification unit 216 may set the consensus verification output as ready for integration if all of the source code reviewer feedback indicates that the code is ready for integration. In another example, source code verification unit 216 will set the consensus verification output as ready for integration if a majority of the feedback indicated that the source code was ready for integration and the other feedback indicates that the source code was inefficient. If even any of the source code reviewers indicates that the source code contains bugs, is incomplete, or does not operate as expected, source code verification unit 216 will set the consensus verification output to rejected. When the consensus verification outcome is set to integrate, source code integration unit 218 automatically integrates the code into the source code project. For example, source code integration unit 218 incorporates the source code into the production source code by either adding the code (or replacing other existing code) and, optionally, recompiling the updated production source code and deploying new executable files. In some examples, source code integration unit 218 automatically integrates one or more portions of source code for which a consensus verification outcome is set to integrate—thereby iteratively integrating the portions of submitted code until all portions of the submitted code are integrated into the production source code. In this way, method 400 allows for disorderly programming with minimal synchronization.

Figure 5:
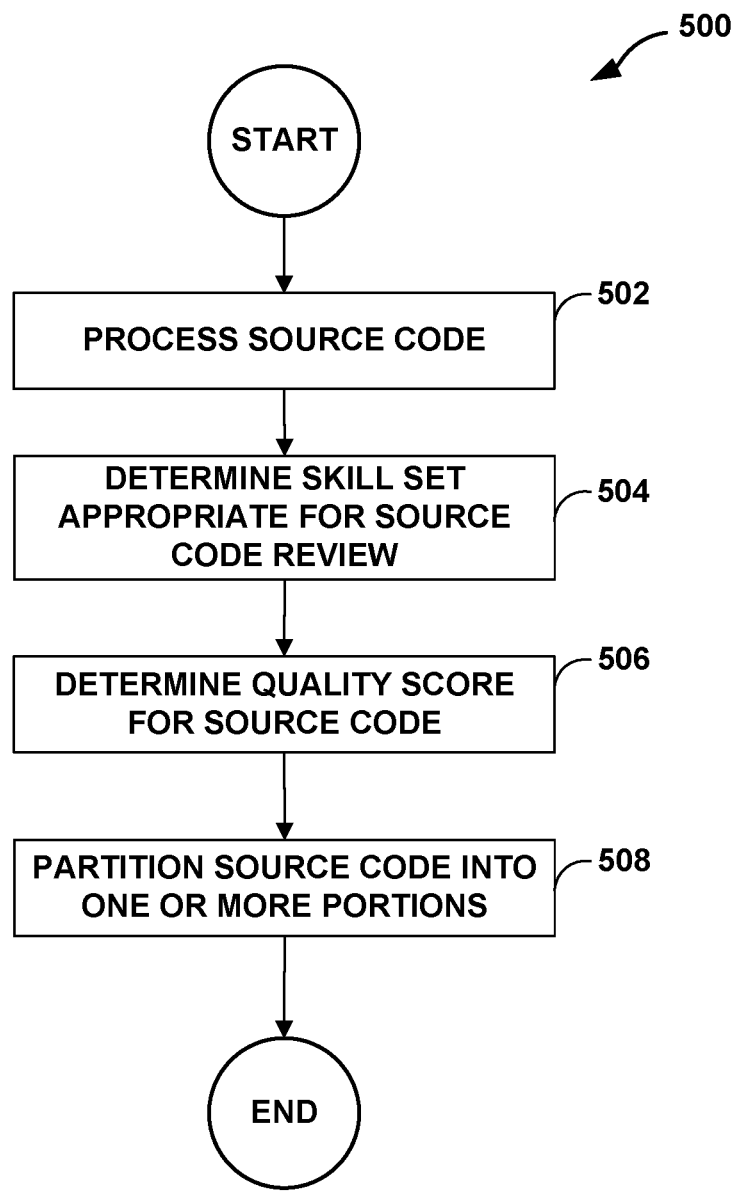
FIG. 5 is a flowchart illustrating an example method of analyzing source code according to the techniques of this disclosure.

FIG. 5 is a flowchart illustrating an example method 500 of analyzing source code according to the techniques of this disclosure. Method 500 is one example of the functions performed by source code analyzer 212 of FIG. 2 (e.g., at step 404 of FIG. 4).

First, source code analyzer 212 processes the submitted source code (502). For example, source code analyzer 212 can examine the code line by line without executing the code using a static source code analysis software tool. In another example, source code analyzer 212 can examine the code by compiling and running the compiled code using a dynamic source code analysis software tool. Either way, this source code analysis software can help understand the structure of the code, find bugs, determine the efficiency of the source code, or otherwise find flaws in the source code. In some examples, the source code analysis software tool can be either commercial off the shelf software or open-source software (e.g., DARPA's Mining and Understanding Software Enclaves (MUSE)).

Source code analyzer 212 then determines a skill set necessary to review the submitted code (504). For example, source code analyzer 212 may determine the programming language that the code is written in based on the output of the source code analysis software tool. In another example, source code analyzer 212 may determine how complex the source code is based on the number of lines of code, the number of files, the structure of the code, the types of libraries used, the number of libraries used, the programming language, or any other output from the source code analysis software tool. In some examples, source code analyzer 212 may determine a quality score for the submitted source code (506). For example, this quality score can be on a scale from 1 to 10, representing a range from poor quality to exceptional quality. This quality score can be based on the output from the source code analysis software tool. For example, source code analyzer 212 may give a low-quality score to inefficient code, monolithic code, code with bugs, or code with any types of flaws. Conversely, the source code analyzer 212 may give a high-quality score to efficient code, modular code, code with very little or no bugs, or code with very little or no flaws.

In some examples, source code analyzer 212 partitions the source code into one or more portions (508). For example, source code analyzer 212 may partition the source code by module, method, functionality, class, or by another feature of the source code. In some examples, some source code may overlap between portions. It is understood that steps 504 through 508 may be performed in any other order. For example, source code analyzer 212 may partition the source code (508) after processing the source code (502), source code analyzer 212 may then determine a skill set necessary for reviewing each portion of the source code (504), and source code analyzer 212 may finally determine a quality score for each partition of the source code or the entire source code (506). Similarly, source code analyzer 212 may finally determine a quality score for each portion of the source code or the entire source code before determining a skill set that is appropriate or necessary for reviewing each portion of the source code or the entire source code (504).

Figure 6:
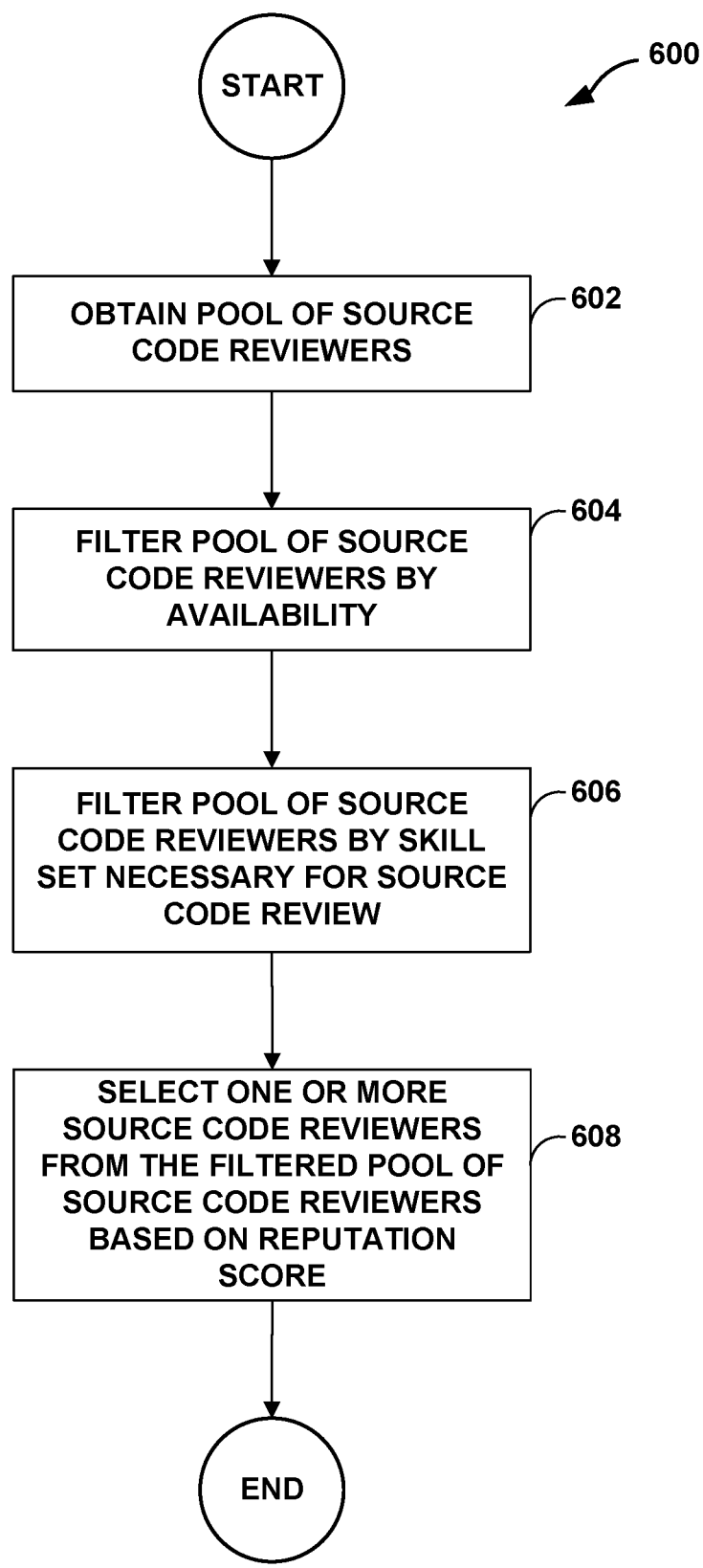
FIG. 6 is a flowchart illustrating an example method of selecting source code reviewers according to the techniques of this disclosure.

FIG. 6 is a flowchart illustrating an example method 600 of selecting source code reviewers to review submitted source code according to the techniques of this disclosure. Method 600 is one example of the functions performed by source code reviewer selector 214 of FIG. 2 (e.g., at step 406 of FIG. 4).

First, source code reviewer selector 214 obtains a pool of source code reviewers (e.g., source code reviewers 106 of FIG. 1, source code reviewers 304, 306, 308 of FIG. 3) (602). For example, source code reviewer selector 214 may query, via one or more communication units 206, source code reviewer data 112 for the pool of source code reviewers. In another example, source code reviewer selector 214 may obtain the pool of source code reviewers from one or more storage devices 210 of FIG. 2. Next, source code reviewer selector 214 may filter the pool of source code reviewers by availability (604) and by the skill set necessary to review the submitted source code (606) such that the filtered pool of source code reviewers are all available and have the skill set necessary to review submitted code. Source code reviewer selector 214 then selects one or more source code reviewers from the filtered pool of source code reviewers based on their reputation scores (608). For example, source code reviewer selector 214 may receive as input the number N of source code reviewers to select (e.g., representing the number of portions the source code was partitioned into) and source code reviewer selector 214 selects N available source code reviewers with the $N^{th}$ highest reputation scores from the filtered pool of source code reviewers. In another example, source code reviewer selector 214 selects N available source code reviewers with a respective reputation score above a threshold reputation score. In some examples, source code reviewer selector 214 selects N random available source code reviewers with a respective reputation score above the threshold reputation score. In some example, source code reviewer selector 214 maintains an indication of how many times each source code reviewer has been selected to review code and selects N available source code reviewers with a respective reputation score above a threshold reputation score that the source code reviewer selector 214 has not recently selected.

It is understood that steps 604 and 608 may be performed in reverse order or may be combined. In some examples, steps 602-608 may be combined. For example, source code reviewer selector 214 may query, via one or more communication units 206, source code reviewer data 112 for available source code reviewers with the necessary skill set to review the received source code such that the pool of source code reviewers obtained from source code reviewer data 112 may represent available source code reviewers with the necessary skill set to review the submitted source code.

Figure 7:
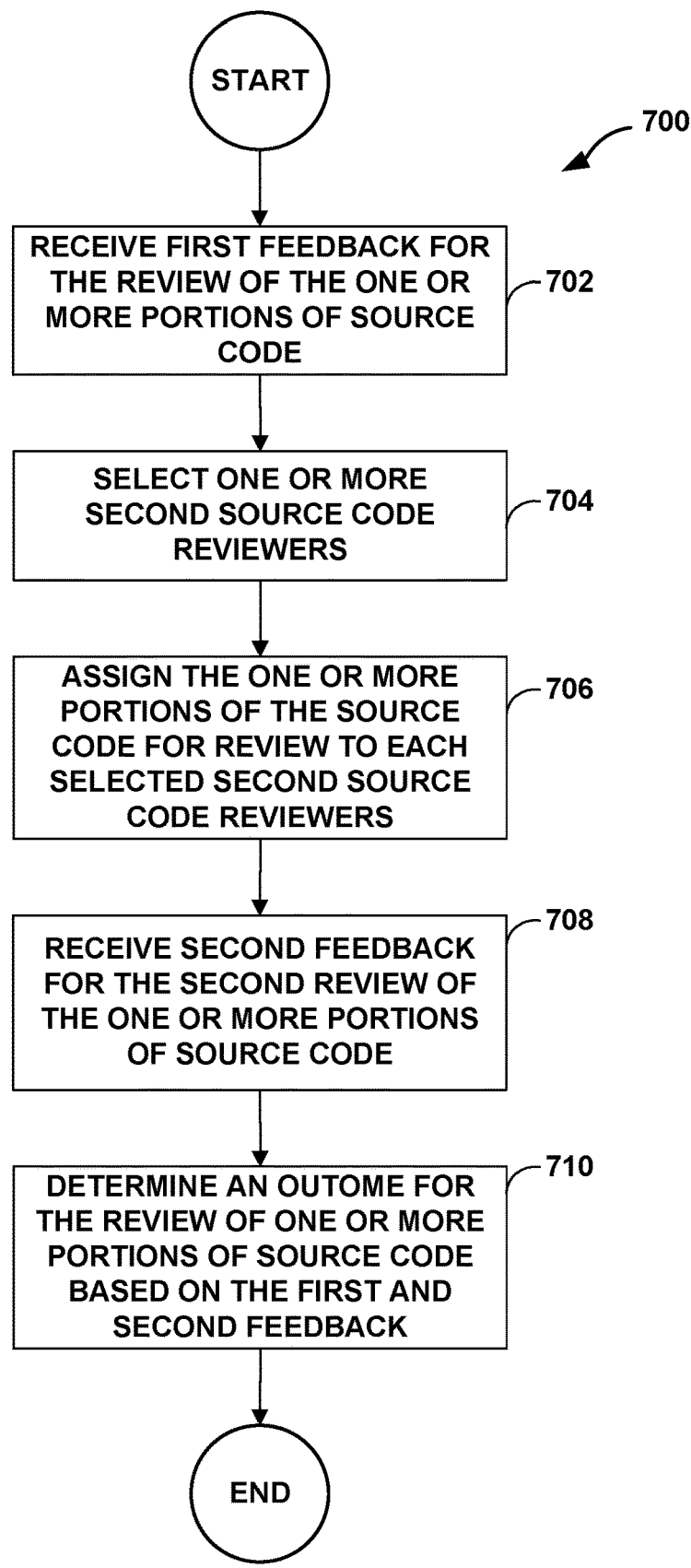
FIG. 7 is a flowchart illustrating an example method of determining a consensus verification output according to the techniques of this disclosure.

FIG. 7 is a flowchart illustrating an example method 700 of determining a consensus verification output according to the techniques of this disclosure. Method 700 is one example of the functions performed by source code verification unit 216 of FIG. 2 (e.g., at step 408 of FIG. 4). First, source code verification unit 216 receives first feedback for the review of the one or more portions of source code from first source code reviewers selected as described at step 406 of FIG. 4 (e.g., source code reviewers 304 of FIG. 3) (702). In some examples, the source code verification unit 216 aggregates and correlates the first feedback from source code reviewers as it is received (e.g., in source code data 110 or one or more storage devices 210). As feedback is received by each source code reviewer, source code reviewer selector 214 may select one or more second source code reviewers to review the same partition of code (e.g., as described above with reference to FIG. 6) (704). Source code reviewer selector 214 then assigns the same one or more portions of source code to the selected second source code reviewers for review (e.g., source code reviewers 306 of FIG. 3) (706). In this way, the system guarantees multi-party code review of the same portion of code for greater quality control. In some examples, source code reviewer selector 214 provides the second set of source code reviewers with the first feedback from the first one or more source code reviewers to first review the code for verification purposes and/or to determine the quality of that reviewer's code review. For example, the second set of source code reviewer may not only provide feedback on the submitted source code but also feedback or comments on the first one or more source code reviewers (e.g., source code reviewers 304 of FIG. 3). It should be understood that not all of the first source code reviewers must complete their review before the second source code reviewers begin their review.

Source code verification unit 216 eventually receives second feedback for the review of the one or more portions of source code from the selected second source code reviewers (e.g., source code reviewers 306 of FIG. 3) (708). In some examples, the source code verification unit 216 aggregates and correlates the second feedback from the second source code reviewers with the first feedback from the first source code reviewers (e.g., in source code data 110 or one or more storage devices 210). In some examples, source code reviewer selector 214 reassigns the same one or more portions of source code to a third set of source code reviewers for review (e.g., source code reviewers 308 of FIG. 3), and so on. In some examples, source code verification unit maintains a shared status of source code (e.g., an entire project and/or each partition). The shared status is usually a data structure supported by a replicated oracle.

Source code verification unit 216 then determines an outcome for the review of the one or more portions of source code based on the first feedback and second feedback (710). For example, source code verification unit 216 may set the output as ready for integration if the first feedback and the second feedback indicate that the code is ready for integration. In another example, source code verification unit 216 will set the output as ready for integration if a majority of the first feedback and second feedback indicate that the source code is ready for integration and the other feedback indicates that the source code is inefficient. If even any of the feedback indicates that the source code contains bugs, is incomplete, or does not operate as expected, source code verification unit 216 may set the output to rejected. In some examples, when source code overlaps between source code portions (e.g., partitions), source code verification unit 216 will set the output for each overlapping portion as ready for integration only if every overlapping partition is individually ready for integration. For example, if an overlapping portion of source code is rejected, source code verification unit 216 will set the output for each overlapping portion of source code as rejected as well. In some examples, when source code verification unit 216 rejects the source code, source code integration unit 218 forgoes integrating the source code and source code verification 216 notifies, via one or more communication units 206, the source code developer. In some examples, the notification may include at least part of the first feedback and/or the second feedback. In this way, the source code developer may address the issues in the source code submission. When the consensus verification outcome is set to integrate, source code integration unit 218 automatically integrates the code into the source code project and/or source code repository. For example, source code integration unit 218 incorporates the source code into the production source code by either adding the code (or replacing other existing code) and, optionally, recompiling the updated production source code and deploying new executable files.

Figure 8:
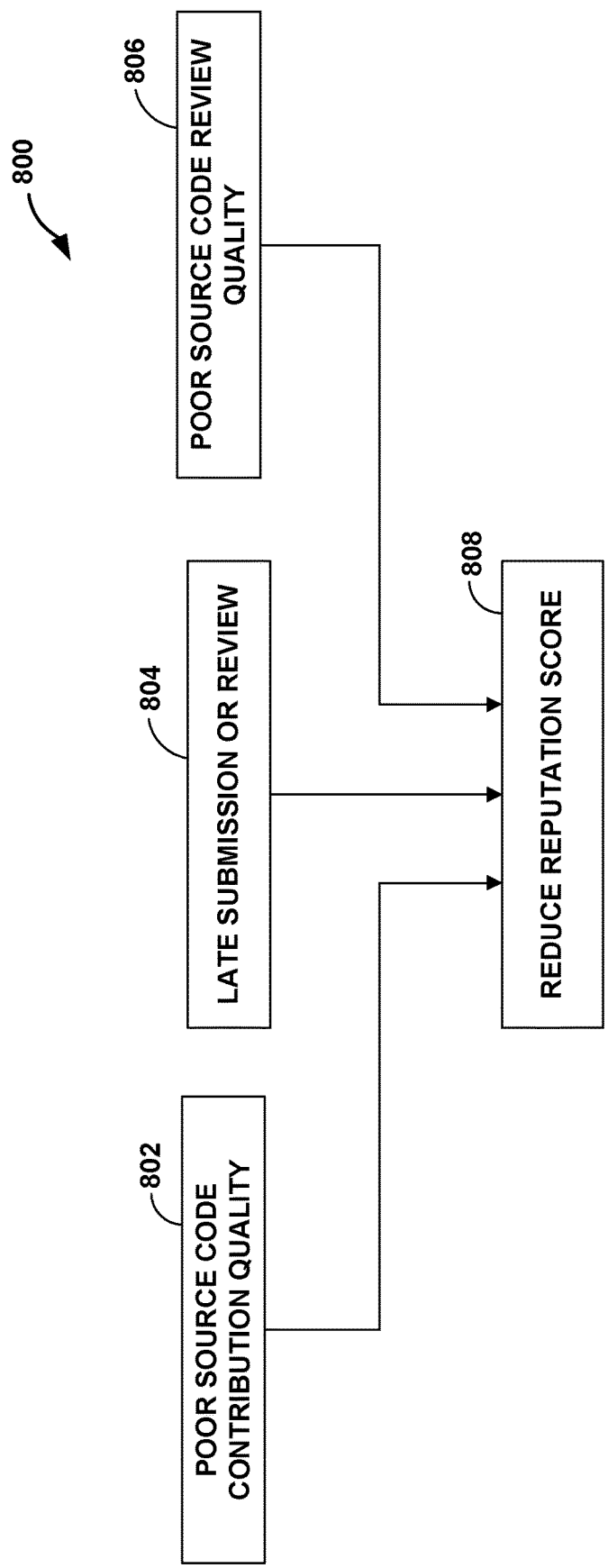
FIG. 8 is a flowchart illustrating example factors that can reduce a reputation score according to the techniques of this disclosure.

FIG. 8 is a flowchart 800 illustrating example factors that can reduce a reputation score according to the techniques of this disclosure. The reputation score may represent a source code reviewer's reputation or trustworthiness and may be used to determine how source code review tasks are assigned (e.g., as described above with references to FIGS. 6 and 7). In some examples, a software development management system (e.g., computing system 102) may assign a maximum reputation score to new source code reviewers (e.g., 100 points) and either maintain or reduce they reputation score over time. In this way, a system in accordance with this disclosure initially assumes all code reviewers are well-behaved workers and new source code reviewers will automatically be given an opportunity to take on software development tasks. Workers are well-behaved if they promptly deliver—in most cases—good quality work. With that in mind, the maximum reputation score at signup for new source code reviewers acts as their proof of liability in the network. Each source code reviewer is then encouraged to retain this reputation score as close as possible to the original awarded amount or, in some examples, increase their reputation score over time based upon the quality and timeliness of their contributions, for instance. This will give the source code reviewer a good standing status in the network. A participant that is in good standing has unabated powers to conduct its activities in the network, which also include the access to interesting and complex work. The system guarantees visibility and access to interesting work for participants with a good standing status. Conversely, the system reduces these guarantees if a contributor's reputation score tarnishes as a consequence of their inability to meet their obligations in the network. For example, the system may reduce the reputation score for a source code reviewer in response to certain factors (808), including poor source code contribution quality 802, late submissions or reviews 804, and/or poor source code review quality 806. For example, the system may reduce a source code developer's reputation score if source code they submit for review is rejected (e.g., as described above with reference to FIG. 7). In another example, the system may reduce a source code developer's reputation score if the source code analyzer 212 determines a quality score below a quality threshold (e.g., 5 in a scale from 1 to 10) as described above with reference to FIG. 5. The system may also reduce a source code contributor's reputation score for late source code submissions or late source code review feedback. Moreover, the system may reduce a source code reviewer's reputation score for poor source code review feedback quality. As described above with reference to FIGS. 3 and 7, the same source code may be reviewed by multiple source code reviewers and the second (or beyond) reviewers may comment on the review conducted by the first source code reviewer(s). If the second set of source code reviewers indicate that a respective source code reviewer missed bugs, was not thorough in his or her review, did not complete his or her review, or otherwise provide any kind of negative feedback about the respective source code reviewer, the system may reduce the respective source code reviewer's reputation score. In this way, the respective source code reviewer will be incentivized to conduct timely and thorough source code reviews. Otherwise, the respective source code reviewer's reputation score will be reduced, which would negatively impact their ability to receive source code review assignments. In some examples, the system may increase a reputation score (without exceeding the maximum) over time. For example, the system may increase the reputation score for a source code reviewer in response to timely completed assignments, quality source code reviews, and quality source code submissions (e.g., submissions that integrated into a source code project).

In some examples, a source code reviewer may "stake" a certain amount of his or her reputation score for certain source code review tasks. If any of the above factors (e.g., 802-806) result from the review, that source code reviewer may lose the amount of their reputation score that they staked.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method for managing software development, comprising:
 adding, by a computing system and to a first copy of a data structure for managing a status of source code, a first entry for a request to review a first portion of the source code, wherein the first copy of the data structure is managed by a first supervisor;

replicating, by the computing system, the first entry to a second copy of the data structure, wherein the second copy of the data structure is managed by a second supervisor;

adding, by the computing system, to the second copy of the data structure, a second entry for a request to review a second portion of the source code;

determining, by the computing system, a software skill set for the request to review the second portion of the source code;

selecting, by the computing system based on the software skill set and respective reputation scores for a pool of source code reviewers, one or more source code reviewers from the pool of source code reviewers;

assigning, by the computing system, the second portion of the source code for code review to each of the one or more source code reviewers;

determining, by the computing system, a consensus verification output on the second portion of the source code based on aggregated and correlated review input from a majority of the one or more source code reviewers;

determining, by the computing system, that the first entry replicated to the second copy of the data structure indicates the review of the first portion of the source code is complete and that the consensus verification output is indicative of a positive consensus outcome; and responsive to determining, by the computing system, that the first entry replicated to the second copy of the data structure indicates the review of the first portion of the source code is complete and that the consensus verification output is indicative of a positive consensus outcome, automatically integrating, by the computing system, the second portion of the source code into a production source code for recompilation.

2. The method of claim 1,
wherein the source code is written by one or more developers,
wherein the one or more developers comprises a first developer that has a first reputation score, the method further comprising:
determining, by the computing system using a source code analysis software tool, a quality score for the source code and updating the first reputation score of the first developer based on the quality score,
wherein selecting the one or more source code reviewers is further based on the updated first reputation score of the first developer.

3. The method of claim 1, wherein selecting the one or more source code reviewers further comprises selecting each of the one or more source code reviewers in response to determining that the respective reputation score for the one or more source code reviewers is above a threshold reputation score.

4. The method of claim 1, further comprising: reducing, by the computing system, the respective reputation score for each of the one or more source code reviewers that does not complete the assigned second portion of the source code by a deadline or that provides low quality review feedback.

5. The method of claim 1, further comprising analyzing the source code using a source code analysis software tool.

6. The method of claim 1, wherein the source code comprises open-source code pushed to an open-source project repository.

7. The method of claim 1, further comprising:
determining, by the computing system, the consensus verification output indicates a negative consensus outcome; and
responsive to determining, by the computing system, the consensus verification output indicates a negative consensus outcome, foregoing automatically integrating, by the computing system, the second portion of the source code into the production source code.

8. The method of claim 1, wherein the first and second portions of the source code can be overlapping; and
wherein assigning the second portion of the source code comprises assigning the second portion of the source code for code review to two or more of the one or more source code reviewers.

9. The method of claim 1, further comprising:
assigning the first portion of the source code for code review to a first set of the one or more source code reviewers;
assigning the second portion of the source code for code review to a second set of the one or more source code reviewers, wherein the first portion and the second portion overlap in an overlapping portion of the source code; and
determining overlapping consensus verification output on the overlapping portion based on review input from the first set of the one or more source code reviewers and from the second set of the one or more source code reviewers.

10. The method of claim 1, further comprising: aggregating and correlating review input from the one or more source code reviewers.

11. A non-transitory, computer-readable medium comprising instructions that, when executed, cause one or more processors to:
add, to a first copy of a data structure for managing a status of source code, a first entry for a request to review a first portion of the source code, wherein the first copy of the data structure is managed by a first supervisor;
replicate the first entry to a second copy of the data structure, wherein the second copy of the data structure is managed by a second supervisor;
add, to the second copy of the data structure, a second entry for a request to review a second portion of the source code,
determine a software skill set for the request to review the second portion of the source code;
select, based on the software skill set and respective reputation scores for a pool of source code reviewers, one or more source code reviewers from the pool of source code reviewers;
assign the second portion of the source code for code review to each of the one or more source code reviewers;
determine a consensus verification output on the second portion of the source code based on aggregated and correlated review input from a majority of the one or more source code reviewers;
determine that the first entry replicated to the second copy of the data structure indicates the review of the first portion of the source code is complete and that the consensus verification output is indicative of a positive consensus outcome; and
responsive to determining that the first entry replicated to the second copy of the data structure indicates the review of the first portion of the source code is complete and the consensus verification output indicates a positive consensus outcome, automatically integrate the second portion of the source code into a production source code for recompilation.

12. The non-transitory, computer-readable medium of claim 11,
wherein the source code is written by one or more developers,
wherein the one or more developers comprises a first developer that has a first reputation score, and
wherein the instructions, when executed, further cause the one or more processors to:
determine a quality score for the source code with a source code analysis software tool and updating the first reputation score of the first developer based on the quality score,
wherein the one or more source code reviewers are further selected based on the updated first reputation score of the first developer.

13. The non-transitory, computer-readable medium of claim 11, wherein the instructions cause the one or more processors to select the one or more source code reviewers by selecting each of the one or more source code reviewers in response to determining that the respective reputation score for the one or more source code reviewers is above a threshold reputation score.

14. The non-transitory, computer-readable medium of claim 11, further comprising instructions that cause the one or more processors to: reduce the respective reputation score for each of the one or more source code reviewers that does not complete the assigned second portion of the source code by a deadline or that provides low quality review feedback.

15. The non-transitory, computer-readable medium of claim 11, further comprising instructions that cause the one or more processors to analyze the source code by analyzing the source code using a source code analysis software tool.

16. The non-transitory, computer-readable medium of claim 11, wherein the source code comprises open-source code pushed to an open-source project repository.

17. The non-transitory, computer-readable medium of claim 11, further comprising instructions that cause the one or more processors to:
determine the consensus verification output indicates a negative consensus outcome; and
responsive to determining the consensus verification output indicates a negative consensus outcome, forego automatically integrating the second portion of the source code into the production source code.

18. The non-transitory, computer-readable medium of claim 11, wherein the instructions cause the one or more processors to assign the second portion of the source code by assigning the second portion of the source code for code review to two or more of the one or more source code reviewers.

19. The non-transitory, computer-readable medium of claim 11, further comprising instructions that cause the one or more processors to:
assign the first portion of the source code for code review to a first set of the one or more source code reviewers;
assign the second portion of the source code for code review to a second set of the one or more source code reviewers, wherein the first portion and the second portion overlap in an overlapping portion of the source code; and
determine overlapping consensus verification output on the overlapping portion based on review input from the first set of the one or more source code reviewers and from the second set of the one or more source code reviewers.

20. A software development management system comprising:
one or more processors in communication with a memory, configured to execute a software development management application comprising:
a source code verification unit configured to:
add, to a first copy of a data structure for managing a status of source code, a first entry for a request to review a first portion of the source code, wherein the first copy of the data structure is managed by a first supervisor;
replicate the first entry to a second copy of the data structure, wherein the second copy of the data structure is managed by a second supervisor;
add, to the second copy of the data structure, a second entry for a request to review a second portion of the source code;
a source code analyzer configured to determine a software skill set for the request to review the second portion of the source code;
a source code reviewer selector configured to select, based on the software skill set and respective reputation scores for a pool of source code reviewers, one or more source code reviewers from the pool of source code reviewers;
the source code reviewer selector further configured to assign the second portion of the source code for code review to each of the one or more source code reviewers;
the source code verification unit further configured to determine a consensus verification output on the second portion of the source code based on aggregated and correlated review input from a majority of the one or more source code reviewers; and
a source code integration unit configured to:
determine that the first entry replicated to the second copy of the data structure indicates the review of the first portion of the source code is complete and that the consensus verification output is indicative of a positive consensus outcome; and
responsive to determining that the first entry replicated to the second copy of the data structure indicates the review of the first portion of the source code is complete and the consensus verification output indicates a positive consensus outcome, automatically integrate the source code into a production source code for recompilation.

* * * * *